United States Patent [19]
Otani

[11] Patent Number: 5,963,006
[45] Date of Patent: *Oct. 5, 1999

[54] APPARATUS FOR CONTROLLING STEPPING MOTOR

[75] Inventor: Atsushi Otani, Tokyo, Japan

[73] Assignee: Canon Kabushiki Kaisha

[ * ] Notice: This patent issued on a continued prosecution application filed under 37 CFR 1.53(d), and is subject to the twenty year patent term provisions of 35 U.S.C. 154(a)(2).

[21] Appl. No.: 08/833,993

[22] Filed: Apr. 9, 1997

Related U.S. Application Data

[63] Continuation of application No. 08/348,077, Nov. 23, 1994, abandoned.

[30] Foreign Application Priority Data

Nov. 25, 1993 [JP] Japan ................................ 5-295386

[51] Int. Cl.$^6$ ..................................................... H02P 6/00
[52] U.S. Cl. ......................... 318/696; 318/365; 346/134; 347/104; 347/139
[58] Field of Search .................................. 318/597, 696, 318/685, 364, 365, 375; 368/157; 347/1, 104, 139, 193, 262, 264; 346/134

[56] References Cited

U.S. PATENT DOCUMENTS

| | | | |
|---|---|---|---|
| 3,953,774 | 4/1976 | Sato et al. | 318/597 X |
| 4,476,421 | 10/1984 | Moriguchi | 318/696 |
| 4,477,196 | 10/1984 | Ito | 368/157 |
| 4,857,817 | 8/1989 | Kugioka | 318/696 |
| 5,041,773 | 8/1991 | Takahashi | 318/696 |
| 5,184,310 | 2/1993 | Takenouchi | 318/811 X |
| 5,283,510 | 2/1994 | Tamahi et al. | 318/696 |
| 5,289,095 | 2/1994 | Ushiyama | 318/597 X |
| 5,416,395 | 5/1995 | Hiramatsu et al. | 318/600 |

*Primary Examiner*—Brian Sircus
*Attorney, Agent, or Firm*—Fitzpatrick, Cella, Harper & Scinto

[57] ABSTRACT

An apparatus for controlling a stepping motor used in feeding a sheet, for example, in a facsimile device, includes a driving unit for driving a stepping motor, and an controller for controlling the drive unit, depending upon drive conditions of the stepping motor, to control at least one of the excitation method and the drive current of the stepping motor, thereby suppressing the generation of heat upon stopping of the motor, and stabilizing the rotation thereof.

5 Claims, 5 Drawing Sheets

APPARATUS FOR CONTROLLING STEPPING MOTOR

This application is a continuation of application Ser. No. 08/348,077 filed Nov. 23, 1994, now abandoned.

BACKGROUND OF THE INVENTION

1. Field of the Invention

The present invention relates to an apparatus for controlling a stepping motor used in feeding a sheet, for example in facsimile devices, etc.

2. Related Background Art

In a sheet feeding portion for vertical scanning (feeding) in a reading system or a recording system of a facsimile device, a stepping motor is normally used as a feeding motor, because the synchronous operation and the control of the sheet feed amount are easy to attain.

(I) The following two methods are conventionally employed in order to stop the stepping motor after it is in a driving state.

(1) The stepping motor is gently brought into a stop state from the driving state by controlling the deceleration of rotation in order to avoid out-of-step of the stepping motor.

(2) Phase excitation upon stopping is kept on without a special control so as to stop the motor.

(II) Also, the conventional stepping motor is driven normally by the one-two-phase-on drive.

Supposing a facsimile device has a reading system for reading one line during horizontal scanning for a constant time a in reading storage area of a memory, and the drive speed of the motor changes depending upon the density of reading in the vertical scanning direction. A speed ratio of the motor is 4:1 between in the standard mode and the super-fine mode. In terms of the performance of the motor and the reading speed of one line, the stepping motor is driven so that one step of one-two-phase-on drive of stepping motor corresponds to the minimum feed amount in the vertical scanning direction (1/maximum vertical scanning density).

Recently, the reading speed of one line has been increasing and the speed of sheet feeding is also increasing therewith. Since the reading system of a facsimile device always requires accuracy of sheet feed in minimum feed amounts in the vertical scanning direction, the correspondence is maintained between one step of one-two-phase-on drive and the minimum feed amount in the vertical scanning direction. As a result, the drive speed of the motor has increased. The stepping motor, however, has the characteristic of decreasing its drive torque during high-speed driving. To compensate for this, a system for high-speed drive having a sufficiently high performance or a stepping motor increased in excitation current so as to increase the drive torque must be provided, to achieve an effective high-speed drive.

In the case of above (I), however, when the motor is stopped during high-speed rotation, the phase excitation upon stop is kept on so as to stop the motor, which sometimes causes noise, such as gear tooth noise in the sheet feeding system. Although the occurrence of noise can be prevented by gently stopping the motor by controlling its deceleration from the driving state, there is a drawback that the motor further moves from a position where it is desired to stop, in addition to a need for a complicated control mechanism, and the control of deceleration is not possible under all circumstances.

In the case of above (II), a motor which is selected to have a characteristic of excellent drive torque during high-speed drive, is naturally expensive, which is disadvantageous in respect of costs. The drive with an increased excitation current raises problems such as the generation of the vibration or heat of motor, an increase in load on a driver IC for driving the motor, etc. To solve this problem, it is conceivable that a control of current value is carried out in such a manner that the drive current to the motor is decreased during low-speed drive. However, the current during high-speed drive also increases and there are a lot of restrictions on the current control, because normal driver ICs have four settings of strong/medium/weak/off for the current values. For a control with finer current values, the control and circuits for the control become complex, presenting a drawback that the costs further increase.

SUMMARY OF THE INVENTION

An object of the present invention is to solve the above problems and, therefore, to change the excitation current of a stepping motor upon stopping the motor.

Another object of the present invention is to change at least one of the excitation current and the excitation method of a stepping motor in accordance with a drive condition of the motor.

Other objects of the present invention will be apparent from the following description of specific embodiments.

DESCRIPTION OF THE PREFERRED EMBODIMENTS

An embodiment of the present invention will be described referring to the drawings.

Figure 1:
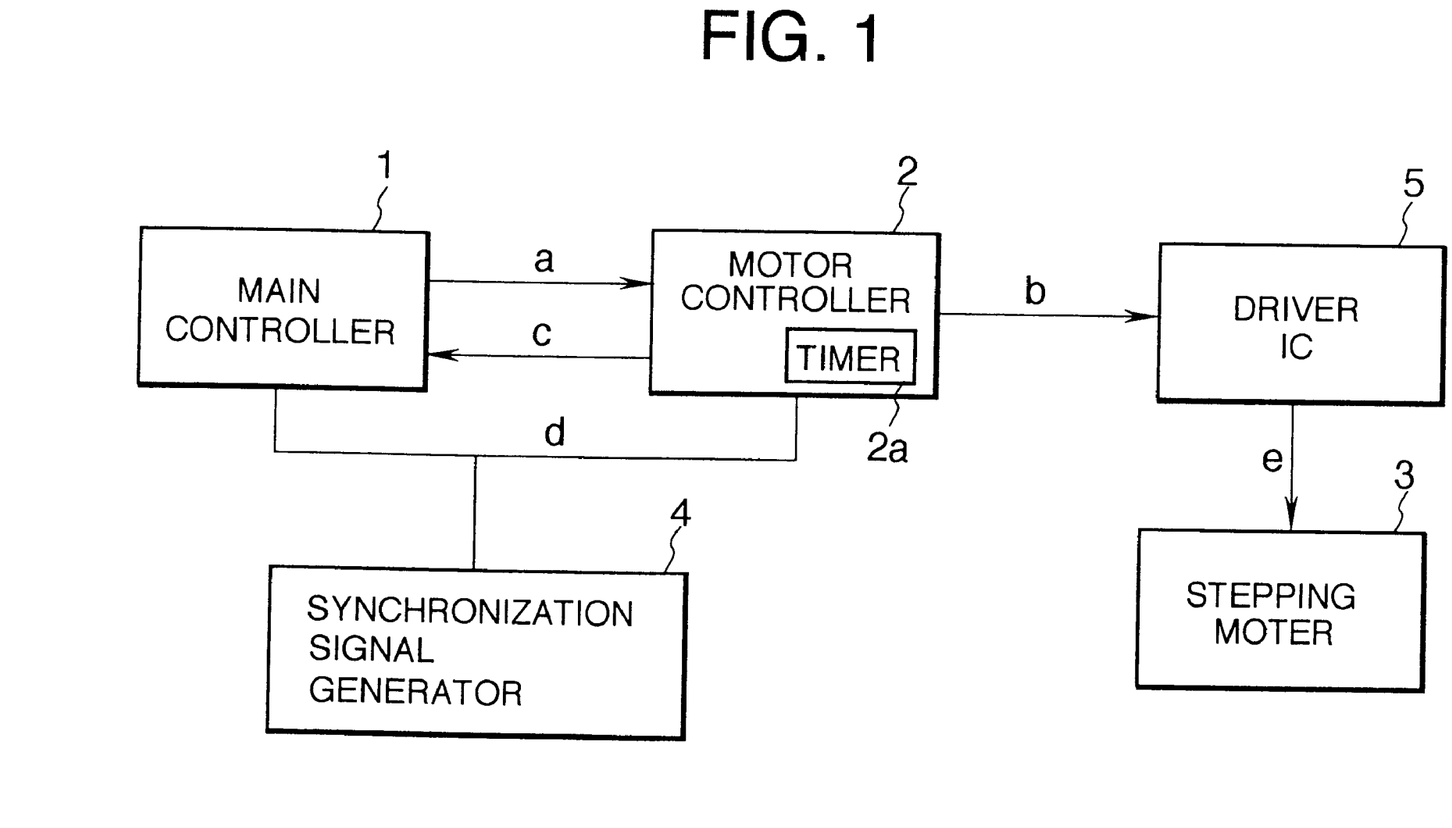
FIG. 1 is a structural drawing of a stepping motor control system in a facsimile device, according to an embodiment of the present invention.

FIG. 1 is a structural drawing of a motor control system in a facsimile device to which the present invention is applied.

In FIG. 1:

reference numeral 1 designates a main controller for controlling the entire system;

2 denotes a motor controller for controlling the motor in response to a command from the main controller 1;

2a denotes a timer;

3 denotes a stepping motor for driving a sheet feeding system;

4 denotes a synchronization signal generator for producing a synchronization signal for synchronization of system;

5 denotes a driver IC for drive of motor;

a denotes a motor drive command from the main controller 1 to the motor controller 2;

b denotes a stepping motor drive output from the motor controller 2;

c denotes a status signal of the motor controller 2;

d denotes a synchronization signal sent from the synchronization signal generator 4;

e denotes an output (motor drive current) from the driver IC 5.

Described, based on this FIG. 1, is changeover of phase excitation of the motor and control of current values.

The motor controller 2 has tables of a plurality of excitation patterns corresponding to the excitation methods of one-two-phase-on drive and two-phase-on drive. In accordance with a drive speed of the motor, the main controller 1 sends a command to select one of the excitation tables of the motor, to the motor controller 2. Receiving this command, the motor controller 2 selects an excitation table according to this command. Receiving the motor drive command from the main controller 1, the motor controller 2 sends the motor drive output b to the driver IC 5 in accordance with data in the table of the selected excitation pattern and in synchronization with the synchronization signal d from the synchronization signal generator 4 so as to drive the stepping motor 3.

Table 1 shows an example of setting of setting values of excitation current and setting of excitation methods for respective drive speeds. Here is listed TEA 3718 (SGS-THOMSOM) as a general driver device for the driver IC. This driver IC has a function of changeover of 100/60/20/0% as setting of current values. As shown in Table 1, the control can be executed according to drive circumstances, combining the selection of excitation methods with the setting of four-step current values of strong/medium/weak/off (100/60/20/0%) as current values of the driver IC.

TABLE 1

Below is an example of setting of excitation methods and current values for respective drive speeds

| Reading Mode | Drive Speed | Excitation/Drive Method (current value) |
|---|---|---|
| Memory read (STD) | High | Two-phase-on drive (100%) |
| Memory read (FINE) | Medium | One-two-phase-on drive (100% for 1-phase-on drive/60% for 2-phase-on drive) |
| Memory read (S.F.) | Low | One-two-phase-on drive (100% for 1-phase-on drive/60% for 2-phase-on drive) |
| Direct transmission | Medium-Low | One-two-phase-on drive (100% for 1-phase-on drive/60% for 2-phase-on drive) |

*STD: standard mode
FINE: fine mode
S.F.: super-fine mode

Since deviation of the excitation phase occurs during the changeover of excitation, for example, between the one-two-phase-on drive and the two-phase-on drive, the motor controller 2 performs a process to adjust the excitation phase upon a change of excitation method, receiving a command to select the excitation pattern from the main controller 1.

The following two modes are considered as reading operations of a facsimile device provided with such a motor control system.

(1) Reading from Memory

Since read data is once stored in a memory, the reading operation is carried out while driving the motor at a constant speed.

(2) Reading Upon Direct Transmission

Depending upon a communication state with a communication partner, the reading operation is carried out while intermittently driving the motor.

Figure 2:
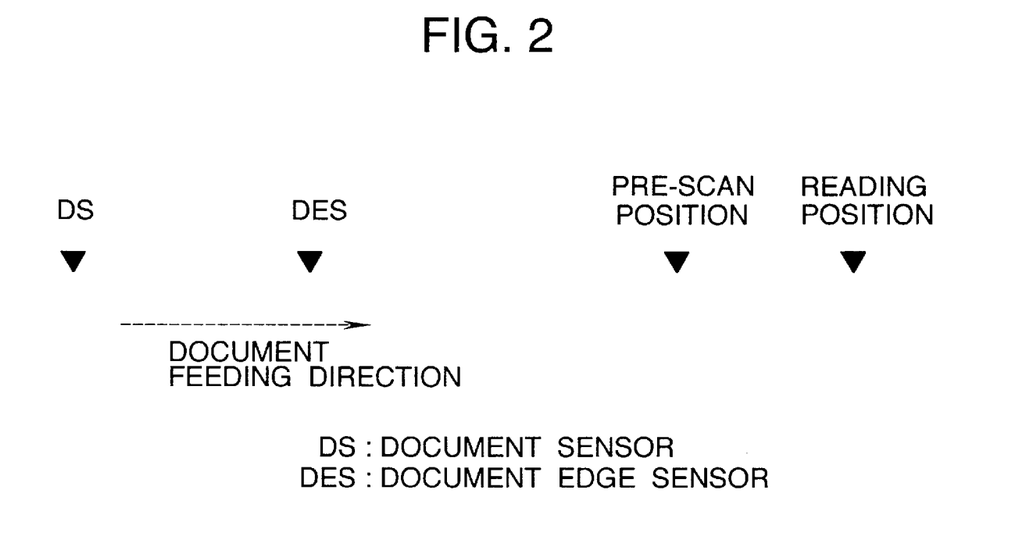
FIG. 2 is a drawing to show a relation between sensors in a sheet feeding system in the facsimile device of FIG. 1 and a reading position.

FIG. 2 shows a relation between sensors in the sheet feeding system and a reading position in such a facsimile device. There are the following three types of the sheet feeding.

(a) Preliminary feeding: A document is fed up to a position before the reading position. The position is determined X1 steps ahead after DES (document edge sensor) is turned on.

(b) Reading feeding: After completion of the preliminary feeding the reading feeding is started and then finished X2 steps ahead after the DES is turned off.

(c) Sheet-discharge feeding: When DS (document sensor) is turned off, the motor is driven X3 steps more. When the DS is on, the above operations of preliminary feeding and reading feeding are continued before the DS is turned off.

It is possible that the deceleration control is executed for stopping the motor at completion of the above operations (a), (b), (c).

However, in the case of feeding in the reading operation during direct transmission, the document reading is carried out intermittently depending upon the transmission state, which also makes the motor drive and the document feeding intermittent in synchronization with the reading operation. With the intermittent operation, stopping (deceleration) of the motor is frequent. The deceleration control at this point causes the motor to move further from the position where it is desired to stop, thus causing omission of. By controlling the excitation current upon stopping during the reading operation, a stable stopping operation can be made, suppressing the gear noise upon stopping.

Figure 3:
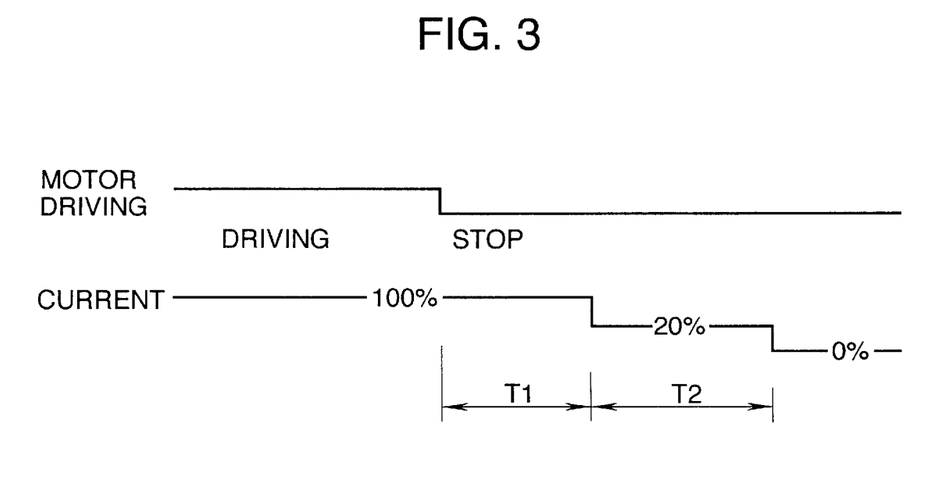
FIG. 3 is a timing chart of current control upon stopping the stepping motor shown in FIG. 1.

FIG. 3 shows an example of the control of, excitation current upon stopping the motor. Here is listed TEA 3718 (SGS-THOMSON) as a general driver device for the driver IC. This driver IC 5 sets current values at 100/60/20/0% and changeover the current between these values. For example, during drive with a current value of 100%, the motor controller 2 performs the following processes.

(1) It decreases the excitation current down to 20% after same-phase excitation is continued over a certain time period T1 counted by the timer 2*a* from a stop point of the motor drive output b.

(2) Further, the motor controller 2 decreases the current value down to 0% after a lapse of a time period T2 counted by the timer 2*a* after the above process (1).

T1 is a time period suitably determined based on the drive speed and the sheet feeding system, and the process (1) can quietly stop the motor.

These serial controls are performed in the motor controller 2, and there is no need of awareness of this process on the side of the main controller 1. There may be, however, a case where the occurrence of noise cannot be suppressed unless braking is effected in as short a time T1 as possible, upon stopping from high-speed feeding. In such a case, the main controller 1 supplies a command in synchronization with the synchronization signal to the motor controller 2 to perform a control operation to decrease T1 only upon stopping.

Figure 4A:
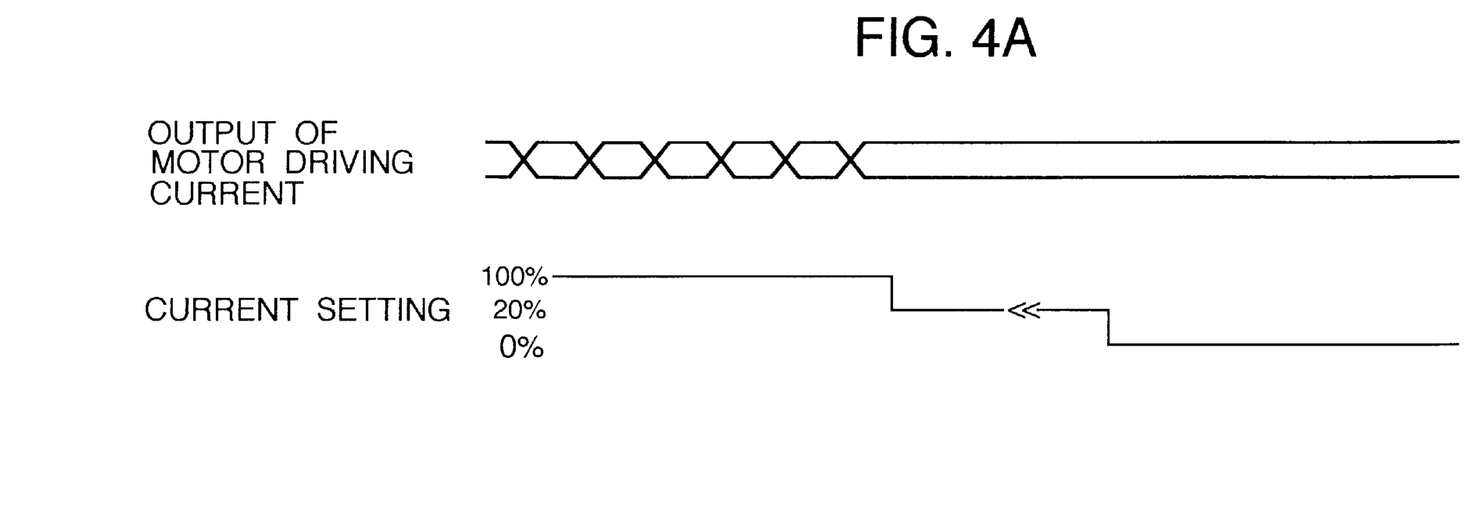
FIGS. 4A and 4B are drawings to show current control upon stopping the motor under different drive conditions of the stepping motor shown in FIG. 1.
Figure 5:
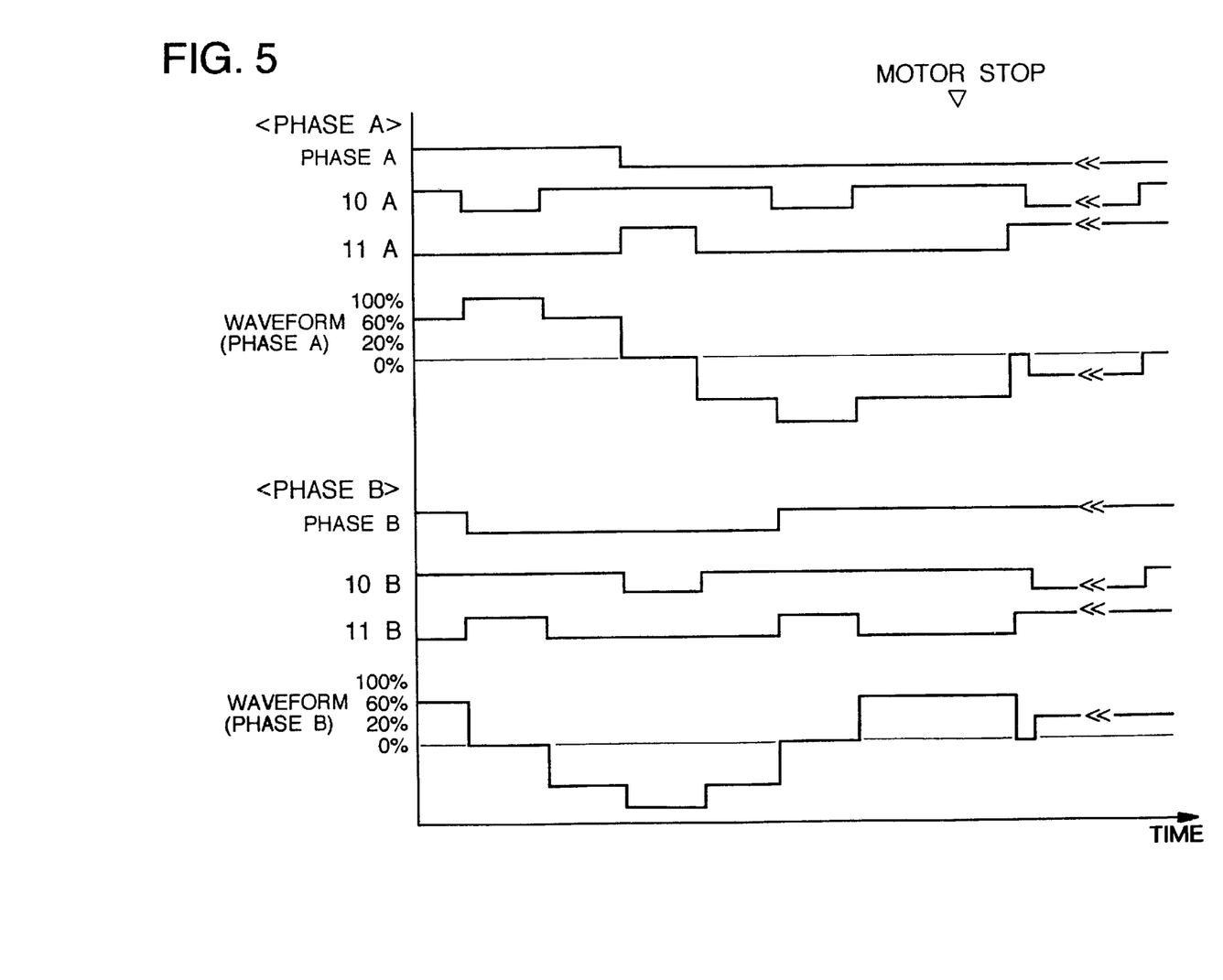
FIG. 5 is a drawing to show current control upon stopping the motor under further different drive conditions of the stepping motor shown in FIG. 1.

The above embodiment shows the current control in stopping the motor by the intermittent drive thereof, while FIG. 4A to FIG. 5 show an example of current control upon stopping the motor under different drive circumstances.

The current control of FIG. 4A is a control to perform the same sequence as the current control of FIG. 3 when the motor is stopped from constant-speed rotation.

Figure 4B:
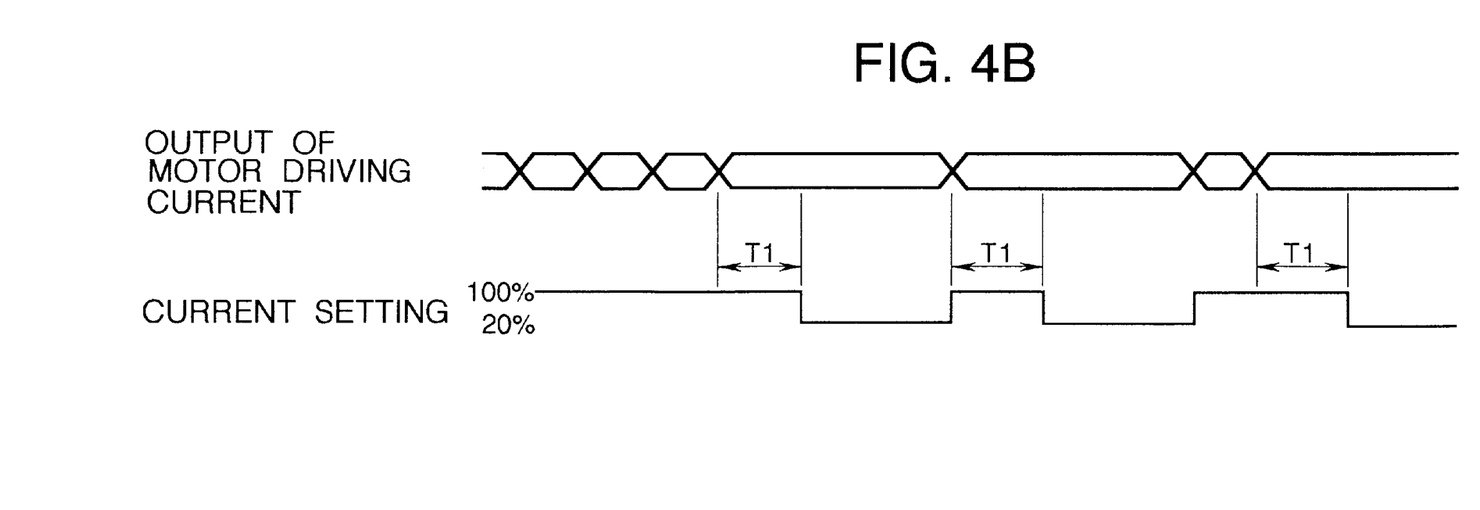

The current control of FIG. 4B is an example of current control when the motor is intermittently driven, the basic idea of which is substantially the same as FIG. 3 and FIG. 4A, excluding a 0% of setting of current values. The excitation current is changed between 100% and 20%. The process to decrease the current value down to 20% can suppress the noise caused by a change in rotation speed of the motor because of the intermittent drive. In FIGS. 4A and 4B, outputs of the motor driving current show changes of the drive current outputs from the stepping motor, flowing in two phases, phase A and phase B.

FIG. 5 shows an example of current control when the process to decrease the current value in stopping the motor is carried out. In this embodiment, because the current value does not drop so fast because of the characteristics of driver IC 5 even with performing a control to simply decrease the current value in excitation of the same phase, the current value is once set to 0% and then excitation is effected with a current value of 20% when the current value drops after a lapse of a constant time.

In FIG. 5, PHASE A, PHASE B, I0, and I1 are of currents supplied as the motor drive output b from the motor controller 2 to the driver IC 5, and current waveforms are of currents supplied as the motor drive current e.

PHASE A and PHASE B are signals to determine the directions of the currents supplied to the phase A and to the phase B of stepping motor 3, and I0 and I1 are logic signals for changing over the current value between 100%, 60%, 20%, and 0%.

As described above, the present invention enables the drive with desirable vibration characteristics, feeding accuracy, and drive torque according to the driving circumstances, without increasing the maximum excitation current of the motor, by changing over the excitation/drive methods depending upon the motor drive conditions. For example one-two-phase-on drive, advantageous with respect to the vibration of the motor is employed as a driving method of the motor for low-speed drive, while the two-phase-on drive is employed in drive, generating torque for high-speed drive. Also, upon stopping the motor, after a lapse of a time period determined depending upon the characteristics of the drive system and the drive speed, the excitation current value is decreased to lower the torque of phase latching and then to stop the motor with suitable damping characteristics, whereby noise, such as gear tooth noise, can be prevented.

Thus, the present invention provides a motor drive usable in a high speed drive system with no increase in load or generation of heat from the motor or driver IC, which had low dissipation power, and which is stable from a low speed to a high speed, thus widening the range of operation conditions under which a motor can operate. Even though the motor is of low cost, it can be applied to a high-speed drive system, thus contributing to a cost reduction of the system.

What is claimed is:

1. An apparatus for controlling a stepping motor, used in feeding of sheet in a facsimile device, said apparatus comprising:

driving means for supplying stepping phase commutation at a given excitation current to drive a stepping motor while receiving a drive signal, and then, upon discontinuance of said driving signal, stopping said phase commutation but maintaining the same excitation current of the phase which was being excited when the driving signal was discontinued, until receipt of a first changeover signal, then, in response to the first changeover signal, reducing the excitation current and maintaining the reduced current until receipt of a second changeover signal, then, in response to the second changeover signal, further reducing said excitation current;

first controlling means provided with a plurality of tables of excitation patterns, for selecting a table in response to a selection signal to control the drive of said stepping motor, said first controlling means having a two-phase-on and a one-two-phase-on drive as the plurality of tables of excitation patterns, said first controlling means generating the first and second changeover signals, said first controlling means counting a first time following discontinuance of said driving signal and generating the first changeover signal at the expiration of said first time, said first controlling means counting a second time following said first changeover signal and generating the second changeover signal at the expiration of said second time; and second controlling means for generating a selection signal for selecting one of said plurality of tables of excitation patterns depending upon a drive speed of the motor, said selection signal generated by said controlling means choosing said two-phase-on drive when high speed motor driving is necessary and choosing said one-two-phase-on driving when low speed motor driving is necessary.

2. An apparatus for controlling a stepping motor, according to claim 1, wherein said driving means lowers the excitation current of the stepping motor from 100% to the predetermined value of 20% when receiving the first changeover signal, and further lowers the excitation current to 0% when receiving the second changeover signal.

3. An apparatus for controlling a stepping motor, according to claim 1, wherein said first controlling means has a timer for counting the first time from the stop of the drive signal and counting the second time from the generation of the first changeover signal.

4. An apparatus for controlling a stepping motor, used in feeding of sheet in a facsimile device, said apparatus comprising:

driving means for supplying stepping phase commutation at a given excitation current to drive a stepping motor while receiving a drive signal, and then, upon discontinuance of said driving signal, stopping said phase commutation but maintaining the same excitation current of the phase which was being excited when the driving signal was discontinued, until receipt of a first changeover signal, then, in response to the first changeover signal, reducing the excitation current and maintaining the reduced current;

first controlling means provided with a plurality of tables of excitation patterns, for selecting a table in response to a selection signal to control the drive of said stepping motor, said first controlling means having a two-phase-on and a one-two-phase-on drive as the plurality of tables of excitation patterns, said first controlling means generating the first changeover signals said first controlling means counting a first time following discontinuance of said driving signal and generating the first changeover signal at the expiration of said first time; and second controlling means for generating a selection signal for selecting one of said plurality of tables of excitation patterns depending upon a drive speed of the motor, said selection signal generated by said controlling means choosing said two-phase-on drive when high speed motor driving is necessary and choosing said one-two-phase-on driving when low speed motor driving is necessary.

5. An apparatus for controlling a stepping motor, according to claim 4, wherein said motor controlling means has a timer for counting the predetermined time from the stopping of the drive signal.

* * * * *

UNITED STATES PATENT AND TRADEMARK OFFICE
CERTIFICATE OF CORRECTION

PATENT NO. : 5,963,006
DATED : October 5, 1999
INVENTOR(S) : ATSUSHI OTANI

It is certified that error appears in the above-identified patent and that said Letters Patent is hereby corrected as shown below:

ON THE TITLE PAGE [57]

ABSTRACT, line 4, "an" should read --a--.

SHEET 1:

Figure 1, "MOTER" should read --MOTOR--.

COLUMN 1:

Line 22, "rotation" should read --rotation thereof-- and "out-of-step" should read --out-of-step operation--;
    Line 31, "a in" should read --in a--;
    Line 34, "in" should be deleted;
    Line 50, "drive" should read --driving-- and "driving." should read --drive.--; and
    Line 57, "stop" (first occurrence) should read --stopping--.

COLUMN 2:

Line 1, "disadvantageous in" should read --disadvantageous.-- and "respect of costs." should be deleted;
    Line 3, "the" (second occurrence) should be deleted; and
    Line 4, "motor" should read --the motor--.

UNITED STATES PATENT AND TRADEMARK OFFICE
CERTIFICATE OF CORRECTION

PATENT NO.    : 5,963,006
DATED         : October 5, 1999
INVENTOR(S)   : ATSUSHI OTANI It is certified that error appears in the above-identified patent and that said Letters Patent is hereby corrected as shown below:

COLUMN 4:

Line 32, "omission of." should read --material to be omitted from being read.--; and
    Line 36, "of," should read --of--.

COLUMN 5:

Line 39, "example" should read --example,--; and
    Line 42, "in drive, generating torque" should read --in generating drive torque--.

Signed and Sealed this

Twenty-seventh Day of June, 2000

Attest:

Q. TODD DICKINSON

*Attesting Officer*       *Director of Patents and Trademarks*